United States Patent
Bang et al.

(10) Patent No.: US 11,082,887 B2
(45) Date of Patent: Aug. 3, 2021

(54) METHOD FOR RETRANSMITTING FRAME IN WIRELESS LAN SYSTEM, AND WIRELESS TERMINAL USING SAME

(71) Applicant: LG ELECTRONICS INC., Seoul (KR)

(72) Inventors: Saehee Bang, Seoul (KR); Jeongki Kim, Seoul (KR); Jinmin Kim, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 71 days.

(21) Appl. No.: 16/489,287

(22) PCT Filed: Feb. 27, 2018

(86) PCT No.: PCT/KR2018/002353
§ 371 (c)(1),
(2) Date: Aug. 27, 2019

(87) PCT Pub. No.: WO2018/155988
PCT Pub. Date: Aug. 30, 2018

(65) Prior Publication Data
US 2020/0068432 A1 Feb. 27, 2020

Related U.S. Application Data

(60) Provisional application No. 62/463,745, filed on Feb. 27, 2017.

(51) Int. Cl.
*H04W 28/04* (2009.01)
*H04L 1/16* (2006.01)
(Continued)

(52) U.S. Cl.
CPC ............ *H04W 28/04* (2013.01); *H04L 1/1635* (2013.01); *H04L 1/1685* (2013.01); *H04L 1/188* (2013.01);
(Continued)

(58) Field of Classification Search
CPC ..... H04W 28/04; H04W 80/02; H04W 80/04; H04W 84/12; H04L 1/1635; H04L 1/1685; H04L 1/188; H04L 1/1671
See application file for complete search history.

(56) References Cited

U.S. PATENT DOCUMENTS

2006/0034174 A1* 2/2006 Nishibayashi ........ H04L 1/1614
370/235
2017/0338914 A1* 11/2017 Chu ...................... H04L 1/1635
(Continued)

FOREIGN PATENT DOCUMENTS

| KR | 20060053671 | 5/2006 |
|---|---|---|
| KR | 100842586 | 7/2008 |
| KR | 20100053689 | 5/2010 |

OTHER PUBLICATIONS

PCT International Application No. PCT/KR2018/002353, International Search Report dated May 21, 2018, 5 pages.
(Continued)

*Primary Examiner* — Jung H Park
(74) *Attorney, Agent, or Firm* — Lee Hong Degerman Kang Waimey

(57) ABSTRACT

A method for frame retransmission performed by a first wireless terminal in a wireless LAN system comprises the steps of: dividing an MSDU received from an upper layer of a first wireless terminal into multiple MPDUs; transmitting the multiple divided MPDUs to a second wireless terminal, wherein each of the multiple divided MPDUs includes division information and transmission sequence information; if an ACK frame for notifying of successful reception
(Continued)

of the multiple divided MPDUs is not received until a preset time elapses, transmitting, to the second wireless terminal, a BAR frame for determining at least one MPDU to be retransmitted by the first wireless terminal among the multiple divided MPDUs; receiving a BA frame from the second wireless terminal in response to the BAR frame, wherein the BA frame includes frame information indicating a last MPDU successfully received by the second wireless terminal among the multiple divided MPDUs; and performing a retransmission procedure on the basis of the frame information.

8 Claims, 11 Drawing Sheets

(51) Int. Cl.
*H04L 1/18* (2006.01)
*H04W 80/02* (2009.01)
*H04W 80/04* (2009.01)
*H04W 84/12* (2009.01)

(52) U.S. Cl.
CPC ............ *H04W 80/02* (2013.01); *H04W 80/04* (2013.01); *H04W 84/12* (2013.01)

(56) References Cited

U.S. PATENT DOCUMENTS

2018/0175991 A1\* 6/2018 Son .................. H04W 72/04
2019/0036651 A1\* 1/2019 Chitrakar .............. H04L 1/1621

OTHER PUBLICATIONS

Sthapit, Pranesh, et al., "Implicit Block ACK Scheme for IEEE 802.11 WLANs", MDPI, Sensors (Basel), Jan. 28, 2016, 10 pages.

\* cited by examiner

FIG. 1
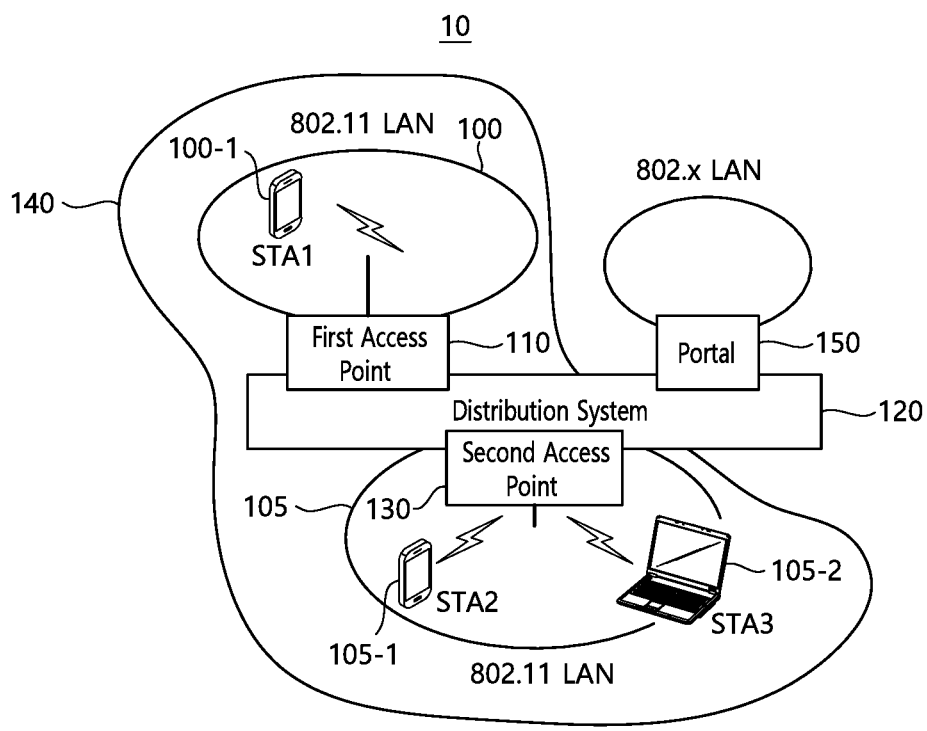
(A)
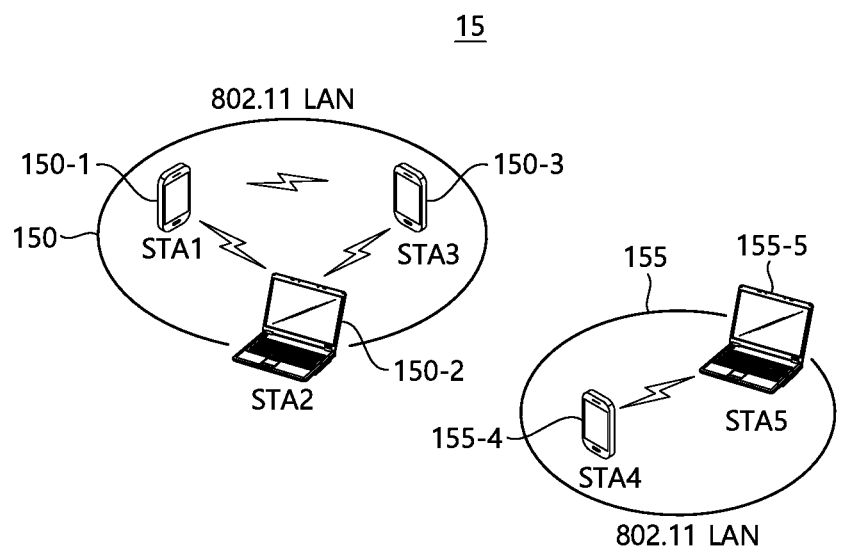
(B)

METHOD FOR RETRANSMITTING FRAME IN WIRELESS LAN SYSTEM, AND WIRELESS TERMINAL USING SAME

CROSS-REFERENCE TO RELATED APPLICATIONS

This application is the National Stage filing under 35 U.S.C. 371 of International Application No. PCT/KR2018/002353, filed on Feb. 27, 2018, which claims the benefit of U.S. Provisional Application No. 62/463,745, filed on Feb. 27, 2017 the contents of which are all hereby incorporated by reference herein in their entirety.

BACKGROUND OF THE INVENTION

Field of the Invention

The present disclosure relates to wireless communication, and more particularly, to a method for retransmitting a frame in a wireless LAN system and a wireless terminal using the same.

Related Art

The Institute of Electrical and Electronics Engineers (IEEE) 802.11ad standard is a high-speed wireless communications standard that operates on the basis of beamforming technology utilizing 60 GHz band characteristics. The region to which signal can be reached is around 10 meters, but throughput can support more than 6 Gbps.

Since the 802.11ad standard operates in the high frequency band, signal propagation can be dominated by ray-like propagation. Signal quality may be improved as the TX (transmit) or RX (receive) antenna beam is aligned to direct a strong spatial signal path.

The IEEE 802.11ad standard provides a beamforming training process for antenna beam alignment. IEEE 802.11ay is the next generation of standards under development aimed at throughputs of more than 20 Gbps and higher on the basis of the IEEE 802.11ad.

SUMMARY OF THE INVENTION

The object of the present disclosure is to provide a method for retransmitting a frame in a wireless LAN system having improved performance and a wireless terminal using the same.

According to an embodiment of the present disclosure, a method for frame retransmission by a first wireless terminal including multiple directional antenna modules in a wireless LAN system comprises the steps of: segmenting, a MAC Service Data Unit (MSDU) received from an upper layer of a first wireless terminal into multiple MAC Protocol Data Units (MPDUs); transmitting the multiple divided MPDUs to a second wireless terminal, wherein each of the multiple divided MPDUs includes division information indicating a total number of the multiple divided MPDUs and transmission sequence information indicating each transmission order of each of the multiple divided MPDUs; if an acknowledgement (ACK) frame for notifying of successful reception of the multiple divided MPDUs is not received until a preset time elapses from the second wireless terminal, transmitting to the second wireless terminal, a Block ACK Request (BAR) frame for determining at least one MPDU to be retransmitted by the first wireless terminal among the multiple divided MPDUs; receiving a Block ACK (BA) frame from the second wireless terminal in response to the BAR frame, wherein the BA frame includes frame information indicating a last MPDU successfully received by the second wireless terminal among the multiple divided MPDUs; and performing, a retransmission procedure on the basis of the frame information.

According to an embodiment of the present disclosure, a method for retransmitting a frame in a wireless LAN system having improved performance and a wireless terminal using the same are provided.

BRIEF DESCRIPTION OF THE DRAWINGS

FIG. 1 is a conceptual diagram showing a structure of a wireless LAN system.

DESCRIPTION OF EXEMPLARY EMBODIMENTS

Figure 2:
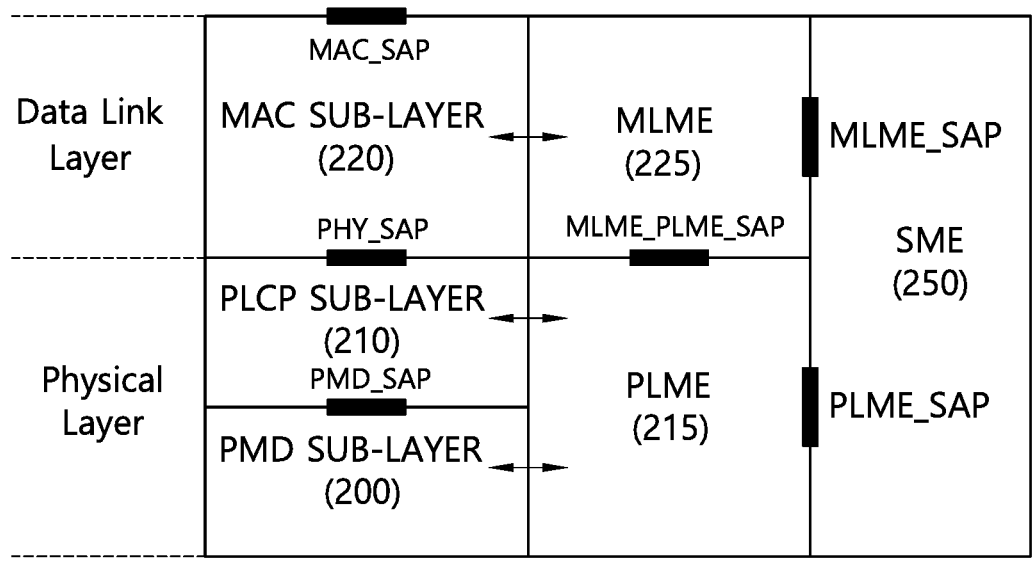
FIG. 2 is a conceptual diagram of a hierarchical architecture of a wireless LAN system supported by IEEE 802.11.

The above-described features and detailed description below are illustrated to aid in description and understanding of the disclosure. That is, the disclosure is not limited to such embodiments and may be embodied in different forms. The following embodiments are examples for thorough disclosure and explanation for delivering the disclosure to those skilled in the art. Therefore, when there are many methods for implementing components of the disclosure, it is necessary to make it clear that the disclosure can be realized through any of a specific one of these methods and a similar one.

When a certain component includes specific elements or a certain process includes specific steps in the disclosure, other elements or other steps may be further included. That is, the terms used in the disclosure are merely for describing particular embodiments, and are not intended to limit the scope of the disclosure. Furthermore, examples described for aiding in understanding of the invention include complementary embodiments thereof.

All terms including technical or scientific terms have the same meanings as generally understood by a person having ordinary skill in the art to which the disclosure pertains unless mentioned otherwise. Generally used terms, such as terms defined in a dictionary, should be interpreted to coincide with meanings of the related art from the context. Unless differently defined in the present invention, such terms should not be interpreted in an ideal or excessively formal manner. Hereinafter, embodiments of the disclosure will be described with reference to the attached drawings.

FIG. 1 is a conceptual diagram showing a structure of a wireless LAN system. FIG. 1(A) shows a structure of an infrastructure network of IEEE (Institute of Electrical and Electronic engineers) 802.11.

Referring to FIG. 1(A), the wireless system 10 shown in FIG. 1(a) may include at least one basic service set (BSS) 100 and 105. A BSS is a set of an access point (AP) and a station (STA) which can communication each other in successful synchronization with each other and does not refer to a specific area.

For example, a first BSS 100 may include a first AP 110 and a single first STA 100-1. A second BSS 105 may include a second AP 130 and one or more STAs 105-1 and 105-2.

The infrastructure BSSs 100 and 105 may include at least one STA, APs providing a distribution service, and a distribution system (DS) 120 which connects the APs.

The distribution system 120 can realize an extended service set (ESS) 140 by connecting the plurality of BSSs 100 and 105. The ESS 140 can be used as a term indicating a network realized by connecting one or more APs 110 and 130 through the distribution system 120. One or more APs included in the single ESS 140 may have the same service set identifier (SSID).

A portal 150 can serve as a bridge for connecting the wireless LAN network (IEEE 802.11) to another network (E.g., 802.X).

In the wireless LAN system having the structure shown in FIG. 1(A), a network between the APs 110 and 130 and a network between the APs 110 and 130 and the STAs 100-1, 105-1 and 105-2 can be realized.

FIG. 1(B) is a conceptual diagram showing an independent BSS. Referring to FIG. 1(B), a wireless LAN system 15 shown in FIG. 1(B) can establish a network between STAs without the APs 110 and 130 such that the STAs can perform communication, distinguished from the wireless LAN system of FIG. 1(A). A network established between STAs without the APs 110 and 130 for communication is defined as an ad-hoc network or an independent basic service set (IBSS).

Referring to FIG. 1(B), the IBSS 15 is a BSS operating in an ad-hoc mode. The IBSS does not have a centralized management entity because an APP is not included therein. Accordingly, STAs 150-1, 150-2, 150-3, 155-4 and 155-5 are managed in a distributed manner in the IBSS 15.

All STAs 150-1, 150-2, 150-3, 155-4 and 155-5 of the IBSS may be configured as mobile STAs and are not allowed to access a distributed system. All STAs of the IBSS constitutes a self-contained network.

An STA mentioned in the disclosure is an arbitrary functional medium including medium access control (MAC) conforming to regulations of IEEE (Institute of Electrical and Electronics Engineers) 802.11 and a physical layer interface with respect to a wireless medium and may be used as a meaning including both an AP and a non-AP station.

The STA mentioned in the disclosure may also be called various terms such as a mobile terminal, a wireless device, a wireless transmit/receive unit (WTRU), a user equipment (UE), a mobile station (MS), a mobile subscriber unit, and a user.

FIG. 2 is a conceptual diagram of a hierarchical architecture of a wireless LAN system supported by IEEE 802.11.

Referring to FIG. 2, the hierarchical architecture of the wireless LAN system may include a physical medium dependent (PMD) sublayer 200, a physical layer convergence procedure (PLCP) sublayer 210 and a medium access control (MAC) sublayer 220.

The PMD syblayer 200 can serve as a transport interface for transmitting and receiving data between STAs. The PLCP sublayer 210 is implemented such that the MAC sublayer 220 can operate with minimum dependency on the PMD sublayer 200.

The PMD sublayer 200, the PLCP sublayer 210 and the MAC sublayer 220 may conceptually include a management entity. For example, a manager of the MAC sublayer 220 is called a MAC layer management entity (MLME) 225. A manager of the physical layer is called a PHY layer management entity (PLME) 215.

These managers can provide interfaces for performing layer management operation. For example, the PLME 215 can be connected to the MLME 225 to perform a management operation of the PLCP sublayer 210 and the PMD sublayer 200. The MLME 225 can be connected to the PLME 215 to perform a management operation of the MAC sublayer 220.

To perform correct MAC layer operation, an STA management entity (SME) 250 may be provided. The SME 250 can be operated as an independent component in each layer. The PLME 215, the MLME 225 and the SME 250 can transmit and receive information based on primitive.

The operation in each sublayer will be briefly described below. For example, the PLCP sublayer 210 transfers a MAC protocol data unit (MPDU) received from the MAC sublayer 220 to the PMD sublayer 200 or transfers a frame from the PMD sublayer 200 to the MAC sublayer 220 between the MAC sublayer 220 and the PMD sublayer 200 according to an instruction of the MAC layer.

The PMD sublayer 200 is a sublayer of PLCP and can perform data transmission and reception between STAs through a wireless medium. An MPDU transferred from the MAC sublayer 220 is referred to as a physical service data unit (PSDU) in the PLCP sublayer 210. Although the MPDU is similar to the PSDU, an individual MPDU may differ from an individual PSDU when an aggregated MPDU corresponding to an aggregation of a plurality of MPDU is transferred.

The PLCP sublayer 210 attaches an additional field including information necessary for a transceiver of the physical layer to a PSDU in a process of receiving the PSDU from the MAC sublayer 220 and transferring the PSDU to the PMD sublayer 200. Here, the attached field may be a PLCP preamble and a PLCT header attached to the PSDU, tail bits necessary to return a convolution encoder to a zero state, and the like.

The PLCP sublayer 210 attaches the aforementioned field to the PSDU to generate a PLCP protocol data unit (PPDU) and transmits the PPDU to a reception station through the PMD sublayer 200, and the reception station receives the PPDU and acquires information necessary for data restoration from the PLCP preamble and the PLCP header to restore data.

Figure 3:
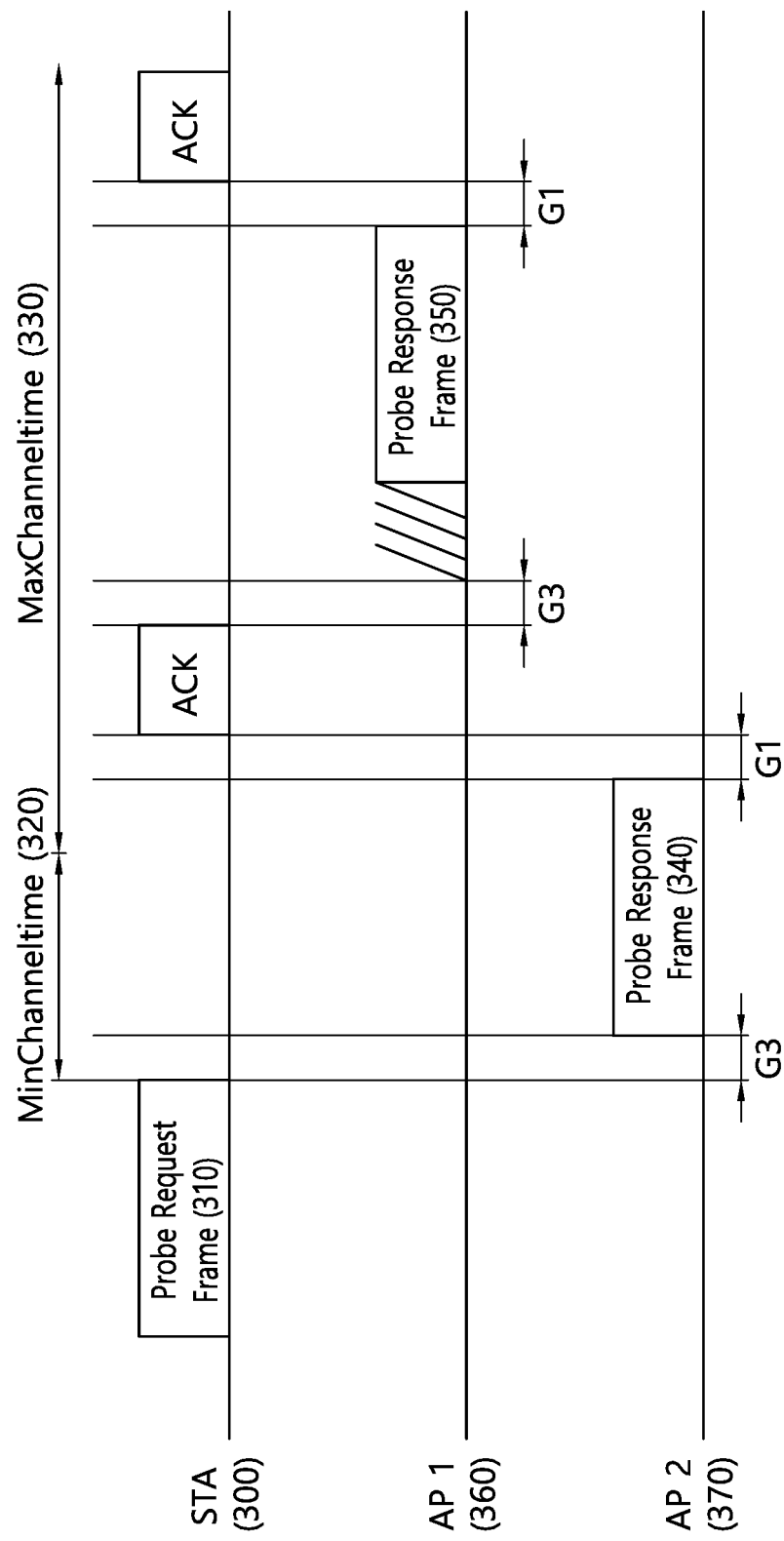
FIG. 3 is a conceptual diagram of an active scanning procedure.

FIG. 3 is a conceptual diagram of an active scanning procedure.

Referring to FIG. 3, the active scanning procedure can be performed as follows.

(1) An STA 300 determines whether to be ready to perform a scanning procedure.

The STA 300 can perform active scanning after waiting until a probe delay time expires or specific signaling information (e.g., PHY-RXSTART.indication primitive is received.

The probe delay time is a delay generated before the STA 300 transmits a probe request frame 510 during active scanning PHY-RXSTART.indication primitive is a signal transmitted from the PHY layer to the MAC layer. PHY-RXSTART.indication primitive can be used to signal, to the MAC layer, information representing that a PLCP protocol data unit (PPDU) including a PLCP header valid in the physical layer convergence protocol (PLCP) has been received.

(2) Basic access is performed.

In 802.11 MAC layer, many STAs can share a wireless medium using, for example, a distributed coordination function (DCF) that is a contention based function. The DCF can prevent collision between STAs through a backoff method using an access protocol (carrier sense multiple access/collision avoidance (CSMA/CA)). The STA 300 can transmit the probe request frame 310 to APs 360 and 370 using a basic access method.

(3) The STA 300 can include information (e.g., service set identification (SSID)) and basic service set identification (BSSID) information) for identifying the APs 360 and 370 which is included in MLME-SCAN.request primitive in the probe request frame 310 and transmit the probe request frame 310 including the information.

A BSSID is an indicator for identifying an AP and can have a value corresponding to the MAC address of the AP. An SSID is a network name for identifying an AP which can be read by an STA operator. A BSSID and/or an SSID can be used to identify an AP.

The STA 300 can identify the APs based on the information for identifying the APs 360 and 370 which is included in MLME-SCAN.request primitive. The identified APs 360 and 370 can transmit probe response frames 350 and 340 to the STA 300. The STA 300 can unicast, multicast or broadcast the probe request frame 310 by transmitting the probe request frame 310 including SSID and BSSID information. A method of unicasting, multicasting or broadcasting the probe request frame 310 using SSID and BSSID information will be additionally described in detail with reference to FIG. 5.

For example, when an SSID list is included in MLME-SCAN.request primitive, the STA 300 can include the SSID list in the probe request frame 310 and transmit the probe request frame 310 including the SSID list. The APs 360 and 370 can receive the probe request frame 310, check SSIDs belonging to the SSID list included in the received probe request frame 310 and determine whether to transmit the probe response frames 350 and 340 to the STA 300.

(4) A probe timer is initialized to "0" and then operated.

The probe timer can be used to check a minimum channel time (MinChanneltime) 320 and a maximum channel time (MaxChanneltime) 330. The minimum channel time 320 and the maximum channel time 330 can be used to control the active scanning operation of the STA 300.

The minimum channel time 320 can be used for the STA 300 to perform an operation of changing a channel in which active scanning is performed. For example, when the STA 300 cannot receive the probe response frames 340 and 350 until the probe timer reaches the minimum channel time 320, the STA 300 can change scanning channels and perform scanning in another channel. When the STA 300 receives the probe response frame 350 before the probe timer reaches the minimum channel time 320, the STA 300 can process the received probe response frames 340 and 350 when the probe timer reaches the maximum channel time 330.

The STA 300 can search for PHY-CCA.indication primitive until the probe timer reaches the minimum channel time 320 to determine whether other frames (e.g., the probe response frames 340 and 350 have been received before the minimum channel time 320.

PHY-CCA.indication primitive can carry information about a medium state from the physical layer to the MAC layer. PHY-CCA.indication primitive can indicate the state of the current channel using a channel state parameter that is "busy" when a channel is not available and "idle" when the channel is available. The STA 300 can determine that the probe response frames 340 and 350 received thereby are present when the searched PHY-CCA.indication indicates "busy" and determine that the probe response frames 340 and 350 received thereby are not present when the searched PHY-CCA.indication indicates "idle".

When PHY-CCA.indication indicating "idle" is searched, the STA can set a network allocation vector (NAV) to 0 and scan the next channel. When PHY-CCA.indication indicating "busy" is searched, the STA 300 can process the probe response frames 340 and 350 received after the probe timer reaches the maximum channel time 330. After processing the received probe response frames 340 and 350, the STA 300 can set the NAV to 0 and scan the next channel.

Hereinafter, PHY-CCA.indication according to the disclosure can be applied to all frames transmitted to the physical layer as well as frame response frames.

(5) When all channels included in a channel list ChannelList are scanned, MLME can signal MLME-SCAN.confirm primitive. MLME-SCAN.confirm primitive can include BSSDescriptionSet including all pieces of information acquired in the scanning procedure.

When the STA 300 uses an active scanning method, the STA 300 needs to monitor whether the PHY-CCA.indication parameter is busy until the probe timer reaches the minimum channel time.

Detailed information included in the aforementioned MLME-SCAN.request primitive is as follows. To perform scanning, an STA can receive MLME-SCAN.request primitive from the MLME. MLME-SCAN.request primitive is a primitive generated by the SME. MLME-SCAN.request primitive can be used to determine whether another BSS to be connected to the STA is present.

Specifically, MLME-SCAN.request primitive can include information such as BSSType, BSSID, SSID, ScanType, ProbeDelay, ChannelList, MinChannelTime, MaxChannelTime, RequestInformation, SSID List, ChannelUsage, AccessNetworkType, HESSID, MeshID, and VendorSpecificInfo.

A request parameter included in MLME-SCAN.request.primitive can be used for a response STA to determine whether to transmit a probe response frame. The request parameter can include information for requesting inclusion of information of another BSS in a probe response frame. Further, the request parameter may include a report request field, a delay reference field, and a maximum delay limit field.

The report request field is information for requesting inclusion of information of another BSS in a probe response frame, the delay reference field includes information about a delay type applied as a response to a probe request frame, and the maximum delay limit field may include information maximum access delay information on a delay type.

In addition, the request parameter may include a minimum data rate field and/or a received signal strength limit field. The minimum data rate field includes information about a lowest total data rate in transmission of an MSDU or an A-MSDU. The received signal strength limit field may further include information about a limit value of a signal necessary for response of a probe request frame receiver.

Figure 4:
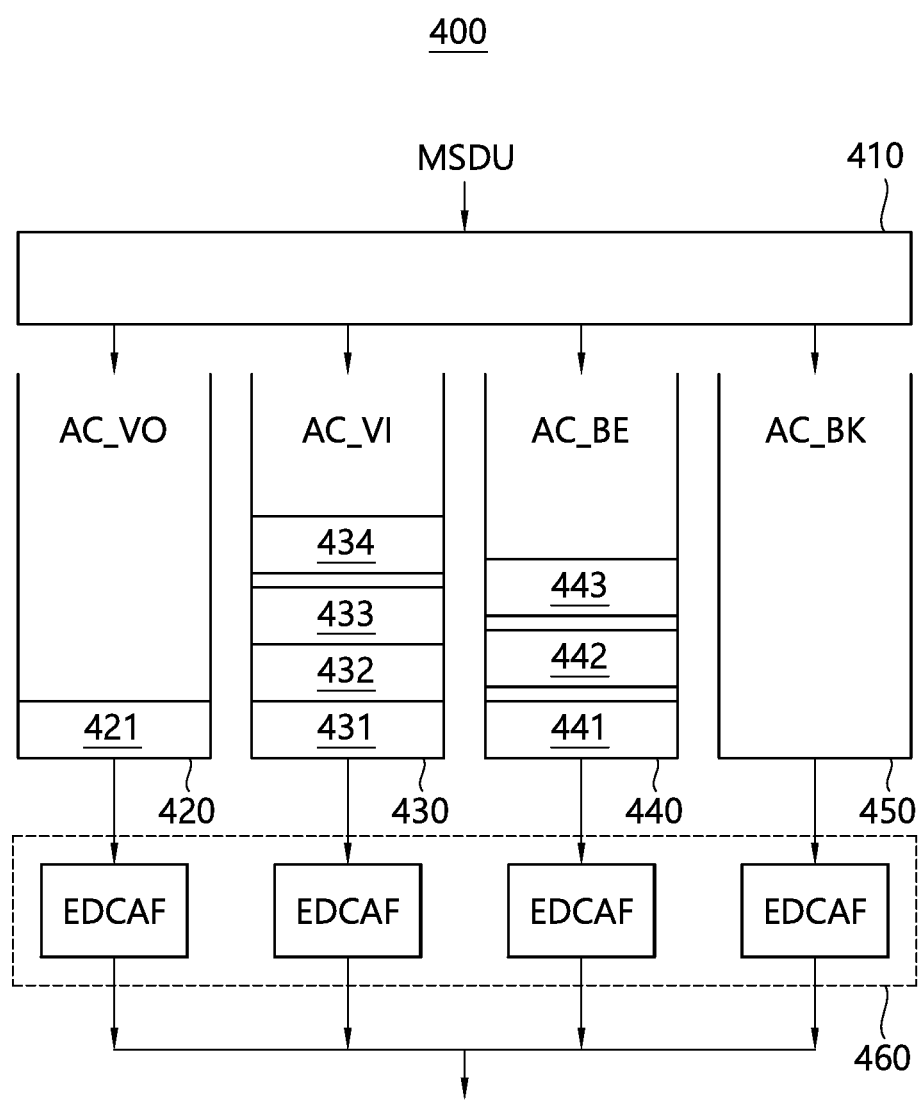
FIG. 4 is a conceptual diagram of an STA supporting EDCA in a wireless LAN system.

FIG. 4 is a conceptual diagram of an STA supporting EDCA in a wireless LAN system.

An STA (or AP) that performs channel access based on enhanced distributed channel access (EDCA) in a wireless LAN system can perform channel access according to a plurality of user priority orders defined in advance for traffic data.

For transmission of a quality of service (QoS) data frame based on a plurality of user priority orders, EDCA can be defined as four access categories (AC) AC_BK (background), AC_BE (best effort), AC_VI (video) and AC_VO (voice).

An STA that performs channel access based on EDCA can map traffic data such as a MAC service data unit (MSDU) arriving at the medium access control (MAC) layer from a logical link control (LLC) layer as shown in Table 1. Table 1 is an exemplary table showing mapping between user priority and AC.

TABLE 1

| Priority | User priority | AC (Access Category) |
|---|---|---|
| Low | 1 | AC_BK |
| | 2 | AC_BK |
| | 0 | AC_BE |
| | 3 | AC_BE |
| | 4 | AC_VI |
| | 5 | AC_VI |
| | 6 | AC_VO |
| High | 7 | AC_VO |

A transmission queue and an AC parameter can be defined for each AC. A plurality of user priority orders can be realized based on different AC parameter values set for ACs.

An STA that performs channel access based on EDCA can use AIFS (arbitration interframe space)[AC], CWmin[AC] and CWmax[AC] respectively instead of DIFS (DCF interframe space), CWmin and CWmax that are parameters based on a distributed coordination function (DCF) when the STA performs a backoff procedure for transmitting a frame belonging to each AC.

For reference, an example of a parameter default value corresponding to each AC is as shown in Table 2.

TABLE 2

| AC | CWmin[AC] | CWmax[AC] | AIFS[AC] | TXOP limit[AC] |
|---|---|---|---|---|
| AC_BK | 31 | 1023 | 7 | 0 |
| AC_BE | 31 | 1023 | 3 | 0 |
| AC_VI | 15 | 31 | 2 | 3.008 ms |
| AC_VO | 7 | 15 | 2 | 1.504 ms |

An EDCA parameter used for the backoff procedure per AC can be set to a default value or loaded in a beacon frame and transmitted from an AP to each STA. Priority increases as the values of AIFS[AC] and CWmin[AC] decrease, and thus channel access delay decreases to allow a larger amount of bands to be used in a given traffic environment.

An EDCA parameter set element may include information about channel access parameters (e.g., AIFS [AC], CWmin [AC] and CWmax[AC]) for each AC.

When collision between STAs occurs while an STA transmits a frame, an EDCA backoff procedure for generating a new backoff counter is similar to a conventional DCF backoff procedure.

An EDCA backoff procedure differentiated for each AC can be performed based on EDCA parameters individually set per AC. The EDCA parameters can be important means used to differentiate channel access of traffic of various user priority orders.

Appropriate setting EDCA parameter values defined per AC can optimize network performance and improve transmission effects according to priority of traffic. Accordingly, an AP can perform management and adjustment of EDCA parameters in order to secure fair medium access of all STAs participating in a network.

In the disclosure, user priority predefined (or preassigned) for traffic data (or traffic) may be referred to as a traffic identifier (TID).

Traffic data transmission priority can be determined based on user priority. Referring to Table 1, a TID of traffic data having highest user priority can be set to "7". That is, traffic data having a TID set to "7" can be understood as traffic having highest transmission priority.

Referring to FIG. 4, one STA (or AP) 400 may include a virtual mapper 410, transmission queues 420 to 450, and a virtual collision handler 460.

The virtual mapper 410 shown in FIG. 4 can serve to map an MSDU received from an LLC layer to a transmission queue corresponding to each AC according to Table 1.

The plurality of transmission queues 420 to 450 shown in FIG. 4 can serve as individual EDCA contention entities for channel access to a wireless medium in one STA (or AP).

For example, the AC VO type transmission queue 420 in FIG. 4 may include a single frame 421 for a second STA (not shown). The AC VI type transmission queue 430 may include three frames 431 to 433 for a first STA (not shown) and one frame 434 for a third STA (not shown) according to order of transmission to the physical layer.

Referring to FIG. 4, one STA (or AP) 400 may include a virtual mapper 410, transmission queues 420 to 450, and a virtual collision handler 460.

The virtual mapper 410 shown in FIG. 4 can serve to map an MSDU received from an LLC layer to a transmission queue corresponding to each AC according to Table 1.

The plurality of transmission queues 420 to 450 shown in FIG. 4 can serve as individual EDCA contention entities for channel access to a wireless medium in one STA (or AP).

For example, the AC VO type transmission queue 420 in FIG. 4 may include a single frame 421 for a second STA (not shown). The AC VI type transmission queue 430 may include three frames 431 to 433 for a first STA (not shown) and one frame 434 for a third STA (not shown) according to order of transmission to the physical layer.

That is, collision between ACs occurs, a frame included in an AC having higher priority can be transmitted first. Further, other ACs can increase contention window values and update values set to the backoff count.

When a certain frame buffered in the transmission queue of the primary AC is transmitted, the STA can transmit the next frame in the same AC for a TXOP period and determine whether ACK for the frame can be received. In this case, the STA attempts to transmit the next frame after an SIFS time interval.

A TXOP limit value may be set to a default value in an AP and an STA or a frame related to the TXOP limit value may be transmitted from the AP to the STA. If the size of a data frame to be transmitted exceeds the TXOP limit value, the STA can fragment the frame into a plurality of small frames. Then, the fragmented frames can be transmitted within a range in which they do not exceed the TXOP limit value.

Figure 5:
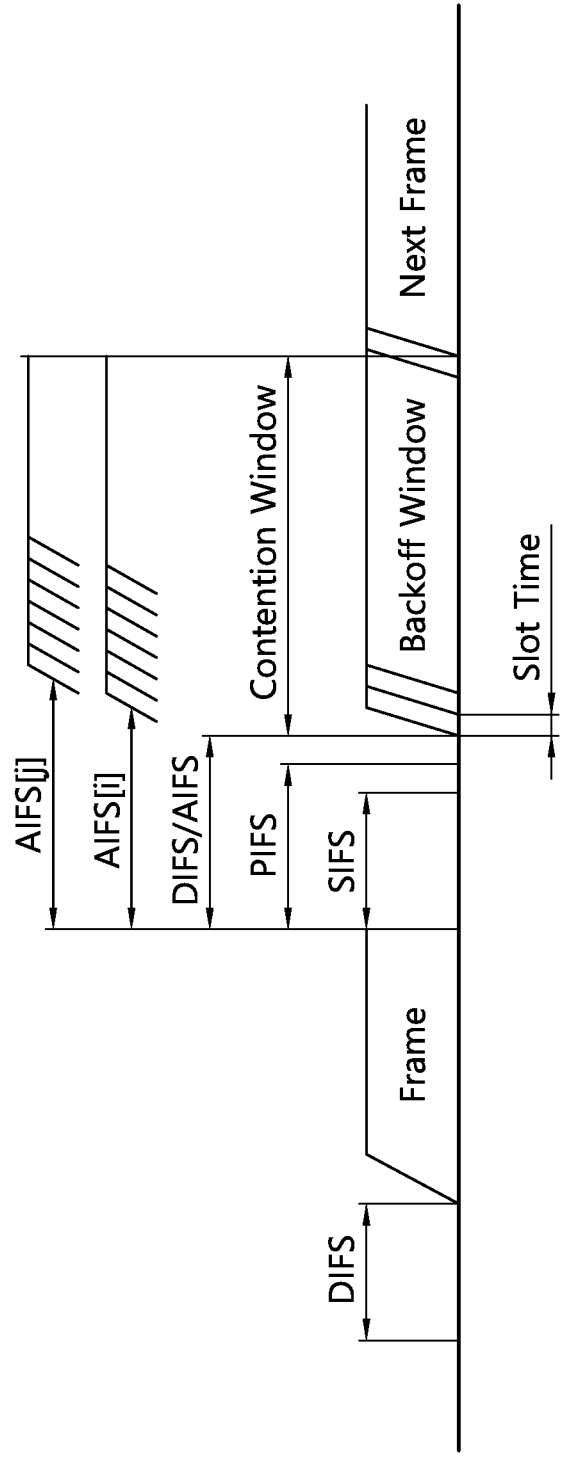
FIG. 5 is a conceptual diagram showing a backoff procedure according to EDCA.

FIG. 5 is a conceptual diagram showing a backoff procedure according to EDCA.

STAs can share a wireless medium based on a distributed coordination function (DCF) that is a contention based function. The DCF is an access protocol for coordinating collision between STAs and can use carrier sense multiple access/collision avoidance (CSMA/CA).

When it is determined that a wireless medium is not used for a DCF interframe space (DIFS) according to the DCF (i.e., in a state in which the wireless medium is idle), an STA can acquire rights to transmit internally determined MPDUs through the wireless medium. For example, the internally determined MPDUs may be understood as frames included in the transmission queue of the primary AC mentioned through FIG. 4.

When the wireless medium is determined to be used by another STA in the DIFS according to the DCF (i.e., in a state in which the wireless medium is busy), the STA can wait until the wireless medium becomes an idle state in order to acquire rights to transmit internally determined MPDUs through the wireless medium.

Subsequently, the STA can defer channel access by the DIFS based on a time at which the wireless medium switches to an idle state. Thereafter, the STA can wait by a contention window (CW) set in a backoff counter.

To perform the backoff procedure according to EDCA, each STA can set a backoff value arbitrarily selected in the CW to the backoff counter. For example, to perform the backoff procedure according to EDCA, a backoff value set in the backoff counter of each STA can be associated with an internal backoff value used in an internal backoff procedure for determining a primary AC of each STA.

In addition, a backoff value set in the backoff counter of each STA may be a value newly set in the backoff counter of each STA based on mathematical expression 1 below and the channel access parameter set (i.e., AIFS [AC], CWmin [AC] and CWmax[AC] in Table 2) for each AC for the transmission queue of the primary AC of each STA.

In the disclosure, a time representing a backoff value selected by each STA in units of slot time can be understood as a backoff window of FIG. 5.

Each STA can perform a countdown operation of reducing the backoff window set in the backoff counter in units of slot time. An STA for which a shortest backoff window is set among a plurality of STAs can acquire transmission opportunity (TXOP) that is the right to occupy a wireless medium.

The remaining STAs can stop the countdown operation during a time for TXOP. The remaining STAs can wait until the time for TXOP ends. After the time for TXOP ends, the remaining STAs can resume the stopped countdown operation in order to occupy the wireless medium.

According to this DCF based transmission method, collision between STAs which may occur when a plurality of STAs simultaneously transmits frames can be prevented. However, a channel access technique using the DCF does not have the concept of transmission priority (i.e., user priority). That is, QoS of traffic to be transmitted by an STA cannot be guaranteed when the DCF is used.

To solve this problem, a hybrid coordination function (HCF) that is a new coordination function has been defined in 802.11e. The newly defined HCF has more enhanced performance than channel access performance of the DCF. The HCF can use two channel access techniques, HCF controlled channel access (HCCA) and enhanced distributed channel access (EDCA), together for the purpose of QoS improvement.

Referring to FIG. 5, it can be assumed that an STA attempts to transmit buffered traffic data. User priority set in each piece of traffic data can be differentiated as shown in FIG. 1. The STA can include output queues of four types AC_BK, AC_BE, AC_VI and AC_VO mapped to user priority of Table 1.

The STA can transmit the traffic data based on an arbitration interframe space (AFID) instead of the DIFS.

Hereinafter, a wireless terminal (i.e., STA) may be a device capable of supporting both a wireless LAN system and a cellular system in embodiments of the disclosure. That is, a wireless terminal can be interpreted as a UE that supports a cellular system or an STA that supports a wireless LAN system.

For smooth description of the disclosure, inter-frame spacing mentioned in 802.11 is described. For example, an inter-frame spacing (IFS) may be a reduced interframe space (RIFS), a short interframe space (SIFS), a PCF interframe space (PIFS), a DCF interframe space (DIFS), an arbitration interframe space (AIFS) or an extended interframe space (EIFS).

The IFS can be determined according to attributes specified by the physical layer of an STA irrespective of a bit rate of the STA. IFSs other than the AIFS can be understood as values fixed for each physical layer.

The AIFS can be understood as a value corresponding to four types of transmission queues mapped to user priority as shown in Table 2.

SIFS has a shortest time gap among the aforementioned IFSs. Accordingly, this can be used when an STA that occupies a wireless medium need to maintain occupation of the medium in a period in which a frame exchange sequence is executed without being disturbed by other STAs.

That is, priority can be given to completion of a frame exchange sequence in progress by using a shortest gap between transmissions in the frame exchange sequence. Further, an STA that accesses a wireless medium using an SIFS can immediately start transmission on an SIFS boundary without determining whether the medium is busy.

An SIFS duration for a specific physical layer can be defined by a SIFSTime parameter. For example, an SIFS value is 16 μs in the physical layers of IEEE 802.11a, IEEE 802.11g, IEEE 802.11n and IEEE 802.11ac.

The PIFS can be used to provide higher priority next to the SIFS to an STA. That is, the PIFS can be used to acquire priority for accessing a wireless access.

The DIFS can be used by an STA that transmits a data frame (MPDU) and a management frame (MPDU) based on the DCF. The STA can transmit frames upon determining that a medium is idle through a carrier sense (CS) mechanism after a received frame and backoff time expire.

Figure 6:
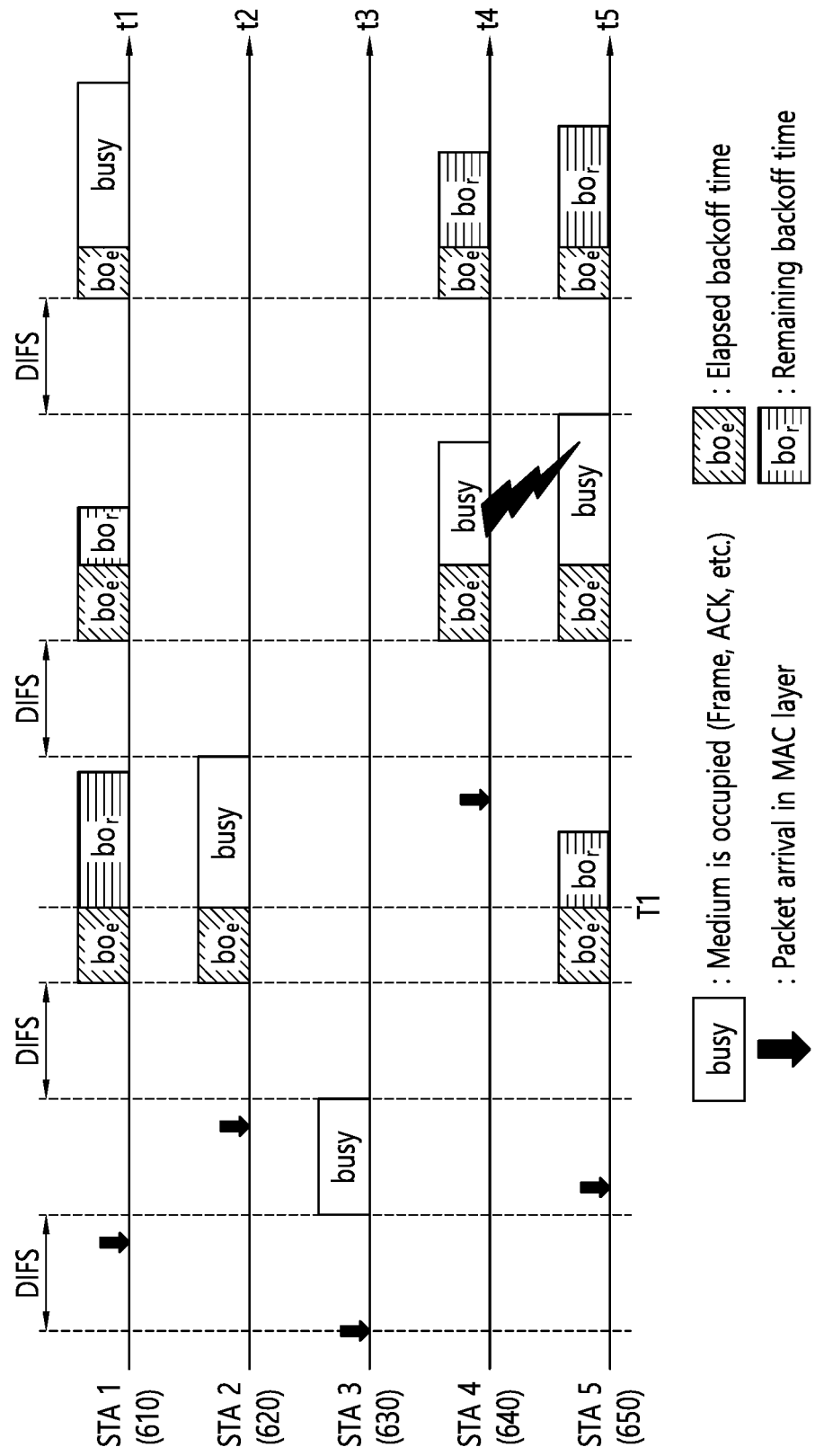
FIG. 6 is a diagram for describing a frame transmission procedure in a wireless LAN system.

FIG. 6 is a diagram for describing a frame transmission procedure in a wireless LAN system.

Referring to FIGS. 5 and 6, STAs 610, 620, 630, 640 and 650 of the wireless LAN system can individually set backoff values for performing a backoff procedure according to EDCA to backoff counters thereof.

Each of the STAs 610, 620, 630, 640 and 650 can attempt transmission after waiting for a time (i.e., the backoff window in FIG. 5) representing the set backoff time in units of slot time.

In addition, the STAs 610, 620, 630, 640 and 650 can reduce the backoff window in units of slot time through a countdown operation. The countdown operation for channel access to a wireless medium can be individually performed by each STA.

Each STA can individually set a backoff time (random backoff time Tb[i]) corresponding to the backoff window to the backoff counter thereof. Specifically, the backoff time Tb[i] is a pseudo-random integer value and can be calculated based on mathematical expression 1 below.

$$T_b[i]=\text{Random}(i)\times\text{SlotTime} \quad \text{[Mathematical expression 1]}$$

In mathematical expression 1, Random(i) is a function that uses uniform distribution and generates a random integer between "0" and CW[i]. CW[i] can be understood as a contention window selected between a minimum contention window CWmin[i] and a maximum contention window CWmax[i].

For example, the minimum contention window CWmin[i] and the maximum contention window CWmax[i] may respectively correspond to default values CWmin[AC] and CWmax[AC] in Table 2.

For example, when CW[i] is set to CWmin[i] for initial channel access, a random integer value between "0" and CWmin[i] can be selected according to Random(i). A random integer value selected according to Random(i) may be referred to as a backoff value in the disclosure.

In mathematical expression 1, i can be understood to correspond to user priority in Table 1. That is, traffic buffered in an STA can be understood to correspond to one of AC_VO, AC_VI, AC_BE and AC_BK in Table 1 based on a value set to i in mathematical expression 1.

SlotTime in mathematical expression 1 can be used to provide a sufficient time such that a preamble of a transmission STA can be detected by a neighbor STA. SlotTime in mathematical expression 1 can be used to define the aforementioned PFIS and DIFS. For example, SlotTime may be 9 μs.

For example, when user priority i is "7", an initial backoff time Tb[7] for a transmission queue of AC_VO type may be a time representing a backoff value selected between 0 and CWmin{AC_VO} in units of slot time (SlotTime).

When collision between STAs has occurred according to a backoff procedure (or when an ACK frame for a transmitted frame has not been received), an STA can newly calculate an increased backoff time Tb[1]' based on mathematical expression 2 below.

$$CW_{new}[i]=((CW_{old}[i]+1)\times PF)-1 \quad \text{[Mathematical expression 2]}$$

Referring to mathematical expression 2, a new contention window $CW_{new}[i]$ can be calculated based on a previous window $CW_{old}[i]$. PF in mathematical expression 2 can be calculated according to a procedure defined in IEEE 802.11e. For example, PF in mathematical expression 2 may be set to "2".

In the present embodiment, the increased backoff time Tb[i]' can be understood as a time representing a random integer (i.e., backoff value) selected between 0 and the new contention window $CW_{new}[i]$ in units of slot times.

If the new contention window $CW_{new}[i]$ reaches or exceeds CWmax[i], $CW_{new}[i]$ can be maintained until $CW_{new}[i]$ is reset to CWmin[i] after successful MPDU transmission.

CWmin[i], CWmax[i], AIFS [i] and PF mentioned in description with reference to FIG. 6 can be signaled from an AP through a QoS parameter set element that is a management frame. CWmin[i], CWmax[i], AIFS [i] and PF may be values preset by an AP and an STA.

Referring to FIG. 6, the horizontal axis t1 to t5 for the first to fifth STAs 610 to 650 can represent a time axis. Further, the vertical axis for the first to fifth STAs 610 to 650 can represent a transmission backoff time.

Referring to FIGS. 5 and 6, when a specific medium switches from a occupied (or busy) state to an idle state, the plurality of STAs can attempt data (or frame) transmission.

Here, as a method for minimizing collision between STAs, each STA can select a backoff time Tb[i] in mathematical expression 1, wait for a slot time corresponding to the selected backoff time and then attempt transmission.

When a backoff procedure starts, each STA can count down an individually selected backoff counter time in units of slot time. Each STA can continuously monitor the medium during countdown.

If the wireless medium in an occupied state is monitored, each STA can stop countdown and wait. If the wireless medium in an idle state is monitored, each STA can resume countdown.

Referring to FIG. 6, when a frame for the third STA 630 arrives at the MAC layer of the third STA 630, the third STA 630 can check whether the medium is idle for a DIFS. When the medium is determined to be idle for the DIFS, the third STA 630 can transmit a frame to an AP (not shown). Although the interframe space (IFS) is illustrated as a DIFS in FIG. 6, the disclosure is not limited thereto.

While the third STA 630 transmits the frame, the remaining STAs can check an occupied state of the medium and wait for a frame transmission period. Frames may arrive at the MAC layers of the first, second and fifth STAs 610, 620 and 650. When it is confirmed that the medium is idle, each STA can wait for the DIFS and then count down an individual backoff time selected by each STA.

FIG. 6 shows a case in which the second STA 620 selects the shortest backoff time and the first STA 610 selects the longest backoff time. At a time T1 at which a backoff procedure for the backoff time selected by the second STA 620 ends and frame transmission starts, the remaining backoff time of the fifth STA 650 is shorter than the remaining backoff time of the first STA 610.

When the medium is occupied by the second STA 620, the first STA 610 and the fifth STA 650 can suspend the backoff procedure and wait. Then, when occupation of the medium by the second STA 620 ends (i.e., the medium becomes an idle state again), the first STA 610 and the fifth STA 650 can wait for the DIFS.

Subsequently, the first STA 610 and the fifth STA 650 can resume the backoff procedure based on the suspended remaining backoff time. In this case, the fifth STA 650 can complete the backoff procedure prior to the first STA 610 because the remaining backoff time of the fifth STA 650 is shorter than the remaining backoff time of the first STA 610.

Referring to FIG. 6, when the medium is occupied by the second STA 620, a frame for the fourth STA 640 can arrive at the MAC layer of the fourth STA 640. When the medium switches to an idle state, the fifth STA 640 can wait for the DIFS. Subsequently, the fourth STA 640 can count down the backoff time selected by the fourth STA 640.

Referring to FIG. 6, the remaining backoff time of the fifth STA 650 may accidentally coincide with the backoff time of the fourth STA 640. In this case, collision between the fourth STA 640 and the fifth STA 650 may occur. When collision between the STAs occurs, both the fourth STA 640 and the fifth STA 650 cannot receive ACK and may fail in data transmission.

Accordingly, the fourth STA 640 and the fifth STA 650 can individually calculate new contention windows $CW_{new}$

[i] according to mathematical expression 2. Then, the fourth STA 640 and the fifth STA 650 can individually count down backoff times newly calculated according to mathematical expression 2.

Meanwhile, when the medium is in an occupied state according to transmission of the fourth STA 640 and the fifth STA 650, the first STA 610 can wait. When the medium becomes idle, the first STA 610 can wait for the DIFS and then resume backoff counting. After the elapse of the remaining backoff time of the first STA 610, the first STA 610 can transmit a frame.

The CSMA/CA mechanism can also include virtual carrier sensing in addition to physical carrier sensing through which an AP and/or an STA directly sense a medium.

Virtual carrier sensing is for supplementing a problem that may be generated in medium access, such as a hidden node problem. For virtual carrier sensing, MAC of a WLAN system uses a network allocation vector (NAV). The NAV is a value by which a remaining time until a medium becomes available is indicated by an AP and/or an STA which are using the medium or have the right to use the medium to other APs and/or STAs.

Accordingly, a value set to the NAV corresponds to a period in which a medium is scheduled to be used by an AP and/or an STA which transmit a corresponding frame, and an STA that receives the NAV value is prohibited from accessing the medium during the period. The NAV can be set according to the value of a duration field of an MAC header of a frame, for example.

Figure 7:
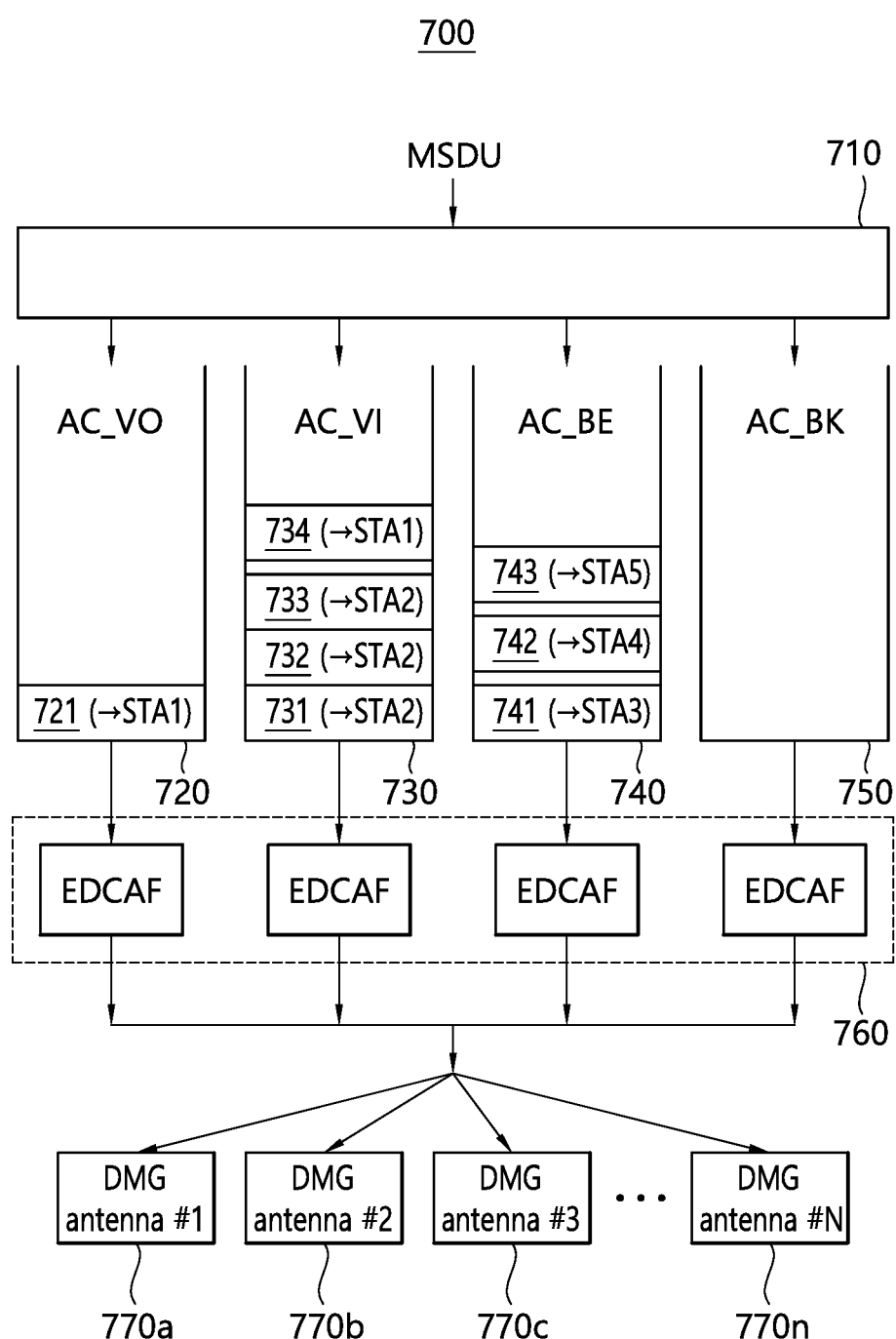
FIG. 7 is a conceptual diagram of a wireless terminal that transmits a frame in a wireless LAN system according to an embodiment of the present invention.

FIG. 7 is a conceptual diagram of a wireless terminal that transmits a frame in a wireless LAN system.

Referring to FIG. 7, a wireless terminal 700 according to the present embodiment may include a virtual mapper 710, a plurality of transmission queues 720 to 750, a virtual collision handler 760 and a plurality of directional antenna modules 770*a* to 770*n*.

Referring to FIGS. 1 to 7, description of the virtual mapper 710, the plurality of transmission queues 720 to 750 and the virtual collision handler 760 can be understood as description of the virtual mapper 410, the plurality of transmission queues 420 to 450 and the virtual collision handler 460 of FIG. 4.

According to the embodiment of FIG. 7, the wireless terminal 700 may have an internal structure in which a set of transmission queues 720, 730, 740 and 750 is associated with the plurality of directional antenna modules 770*a* and 770*n*.

A directional multi-gigabit (DMG) antenna mentioned in the disclosure may include a plurality of physical antennas. Further, the DMG antenna mentioned in the disclosure can be understood as a set of a plurality of antennas physically (or logically) arranged in one (or more) direction.

For concise description, the first directional antenna module 770*a* may include a first DMG antenna associated with a first user terminal (not shown) and the second directional antenna module 770*b* may include a second DMG antenna associated with a second user terminal (not shown).

In addition, the third directional antenna module 770*c* may include a third DMG antenna associated with a third user terminal (not shown) and the n-th directional antenna module 770*n* (n is a natural number) may include an N-th DMG antenna associated with an N-th user terminal (not shown).

Hereinafter, it is assumed that the wireless terminal 700 of FIG. 7 includes five directional antenna modules 770*a* to 770*e*. For example, the wireless terminal 700 of FIG. 7 can associate a plurality of data frames 721, 731 to 734 and 741 to 743 with the plurality of directional antenna modules 770*a* to 770*n* based on receive address (RA) information set in the plurality of data frames 721, 731 to 734 and 741 to 743.

The first data frame 721 can be buffered in the AC VO type transmission queue 720. For example, the first data frame 721 can be understood as an MPDU including RA information indicating the first user terminal (not shown).

The second to fifth data frames 731 to 734 can be buffered in the AC VI type transmission queue 730. For example, the second to fourth data frames 731, 732 and 733 can be understood as an MPDU including RA information indicating the second user terminal (not shown). For example, the fifth data frame 734 can be understood as an MPDU including RA information indicating the first user terminal (not shown).

The sixth to eighth data frames 741 to 743 can be buffered in the AC BE type transmission queue 740. For example, the sixth data frame 741 can be understood as an MPDU including RA information indicating the third user terminal (not shown).

For example, the seventh data frame 742 can be understood as an MPDU including RA information indicating the fourth user terminal (not shown). For example, the eighth data frame 743 can be understood as an MPDU including RA information indicating the fifth user terminal (not shown).

The plurality of data frames included in the transmission queues mentioned in the description with reference to FIG. 7 are merely an example and the disclosure is not limited thereto.

The data frames buffered in the plurality of transmission queues according to the present embodiment can be transmitted through the directional antenna modules 770*a* to 770*n* according to RA information included each data frames.

For example, the first and fifth data frames 721 and 734 can be transmitted through the first directional antenna module 770*a*. The second to fourth data frames 731 to 733 can be transmitted through the second directional antenna module 770*b*.

The sixth data frame 741 can be transmitted through the third directional antenna module 770*c*. The seventh data frame 742 can be transmitted through the fourth directional antenna module 770*d*. The eighth data frame 743 can be transmitted through the fifth directional antenna module 770*e*.

A conventional wireless terminal can perform an omnidirectional clear channel assessment (CCA) procedure. Specifically, a conventional wireless terminal can determine the state of a wireless medium by comparing power levels of signals received from the physical layer of a wireless terminal with a preset threshold level for a predetermined time (e.g., DIFS) in an omnidirectional way.

For example, if the average power level of signals received from the physical layer is lower than the threshold level, the state of the wireless medium can be determined to be idle. If the average power level of signals received from the physical layer is higher than the threshold level, the state of the wireless medium can be determined to be busy.

The wireless terminal 700 according to the present embodiment can cover a plurality of directions associated with the plurality of directional antenna modules 770*a* to 770*n* in a directional way. Specifically, the wireless terminal 700 can perform an individual directional CCA procedure on a plurality of radio channels corresponding to a plurality of directions for a predetermined time.

That is, the wireless terminal 700 can individually determine states of a plurality of radio channels associated with the plurality of directional antenna modules 770a to 770n for a plurality of user terminals (not shown).

Hereinafter, a CCA operation simultaneously performed by the wireless terminal according to the present embodiment for a plurality of directions can be mentioned as a directional CCA procedure.

Each of the plurality of directional antenna modules 770a to 770n can be associated with a radio channel in a specific direction for each user terminal (not shown).

The wireless terminal according to the present embodiment can simultaneously perform a plurality of individual directional CCA procedures in a directional way. That is, a first radio channel may be determined to be busy through a first directional CCA procedure for a first direction among the plurality of directions, and a second radio channel may be determined to be idle through a second directional CCA procedure for a second direction.

Similarly, an N-th radio channel in an N-th direction for an N-th user terminal (not shown) may be determined to be idle (or busy) through a directional CCA procedure.

The wireless terminal according to the present embodiment can transmit data (or data frames) included in a transmission queue of a primary AC based on at least one directional antenna module associated with at least one radio channel determined to be idle.

In addition, the wireless terminal according to the present embodiment can transmit data frames included in the transmission queue of the primary AC and data (or data frames) included in a transmission queue of a secondary AC together based on at least one directional antenna module associated with at least one radio channel determined to be idle.

Furthermore, the plurality of directional antenna modules 770a to 770n can be used to receive radio signals transmitted from other wireless terminals although it is not mentioned in the description related to FIG. 7.

Further, the internal structure of the wireless terminal shown in FIG. 7 is merely an example and the wireless terminal of the disclosure may be realized based on a structure in which a set of a plurality of transmission queues corresponds to a plurality of antenna modules.

Figure 8:
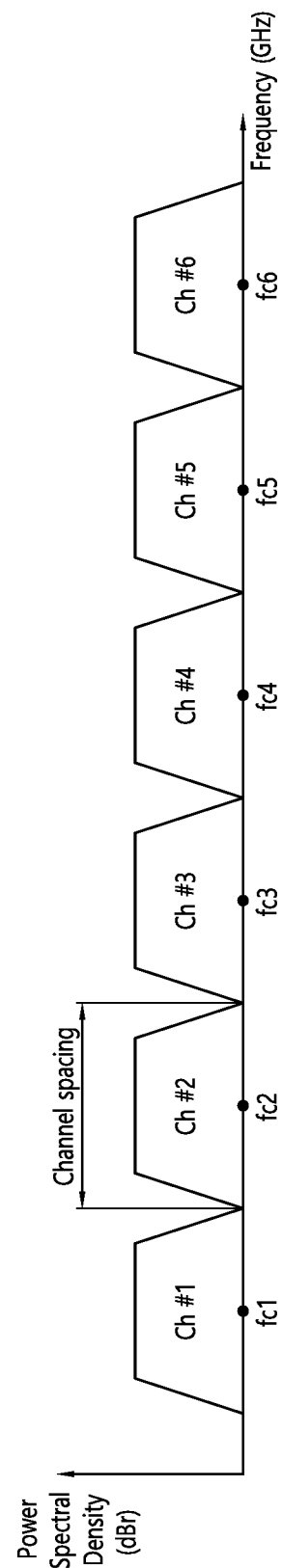
FIG. 8 is a diagram showing channelization of a wireless channel for transmitting frames in a wireless LAN system according to an embodiment of the present invention.

FIG. 8 is a diagram showing channelization of a wireless channel for transmitting frames in a wireless LAN system.

The horizontal axis of FIG. 8 represents a frequency (GHz) for 60 GHz. The vertical axis of FIG. 8 represents a relative signal level (dBr) with respect to maximum spectral density.

Referring to FIG. 8, first to sixth channels ch #1 to ch #6 can be allocated in order to support operation at 60 GHz for the wireless terminal according to the present embodiment. For example, a channel spacing for the first to sixth channels ch #1 to ch #6 may be 2,160 MHz.

A channel center frequency for each of the first to sixth channels ch #1 to ch #6 according to the present embodiment can be defined based on mathematical expression 3 below. For example, a channel starting frequency may be 56.16 GHz.

channel center frequency=channel starting frequency+channel spacing× channel number [Mathematical expression 3]

A first channel center frequency fc1 for the first channel ch #1 may be 58.32 GHz according to mathematical expression 3. For example, the first channel ch #1 in FIG. 8 may be defined between 57.24 GHz and 59.40 GHz.

A second channel center frequency fc2 for the second channel ch #2 may be 60.48 GHz according to mathematical expression 3. For example, the second channel ch #2 in FIG. 8 may be defined between 59.40 GHz and 61.56 GHz.

A third channel center frequency fc3 for the third channel ch #3 may be 62.64 GHz according to mathematical expression 3. For example, the third channel ch #3 in FIG. 8 may be defined between 61.56 GHz and 63.72 GHz.

A fourth channel center frequency fc4 for the fourth channel ch #4 may be 64.80 GHz according to mathematical expression 3. For example, the fourth channel ch #4 in FIG. 8 may be defined between 63.72 GHz and 65.88 GHz.

A fifth channel center frequency fc5 for the fifth channel ch #5 may be 66.96 GHz according to mathematical expression 3. For example, the fifth channel ch #5 in FIG. 8 may be defined between 65.88 GHz and 68.04 GHz.

A sixth channel center frequency fc6 for the sixth channel ch #6 may be 69.12 GHz according to mathematical expression 3. For example, the sixth channel ch #6 in FIG. 8 may be defined between 68.04 GHz and 70.2 GHz.

Channelization and channel numbering mentioned in the disclosure are described in more detail in section 19.3.15 of IEEE Draft P802.11-REV$_{mc}$™/D8.0 disclosed on August 2016 and sections 21.3.1 and 21.3.2 and Annex E of IEEE Std 802.11ad™ disclosed on December 2012.

Figure 9:
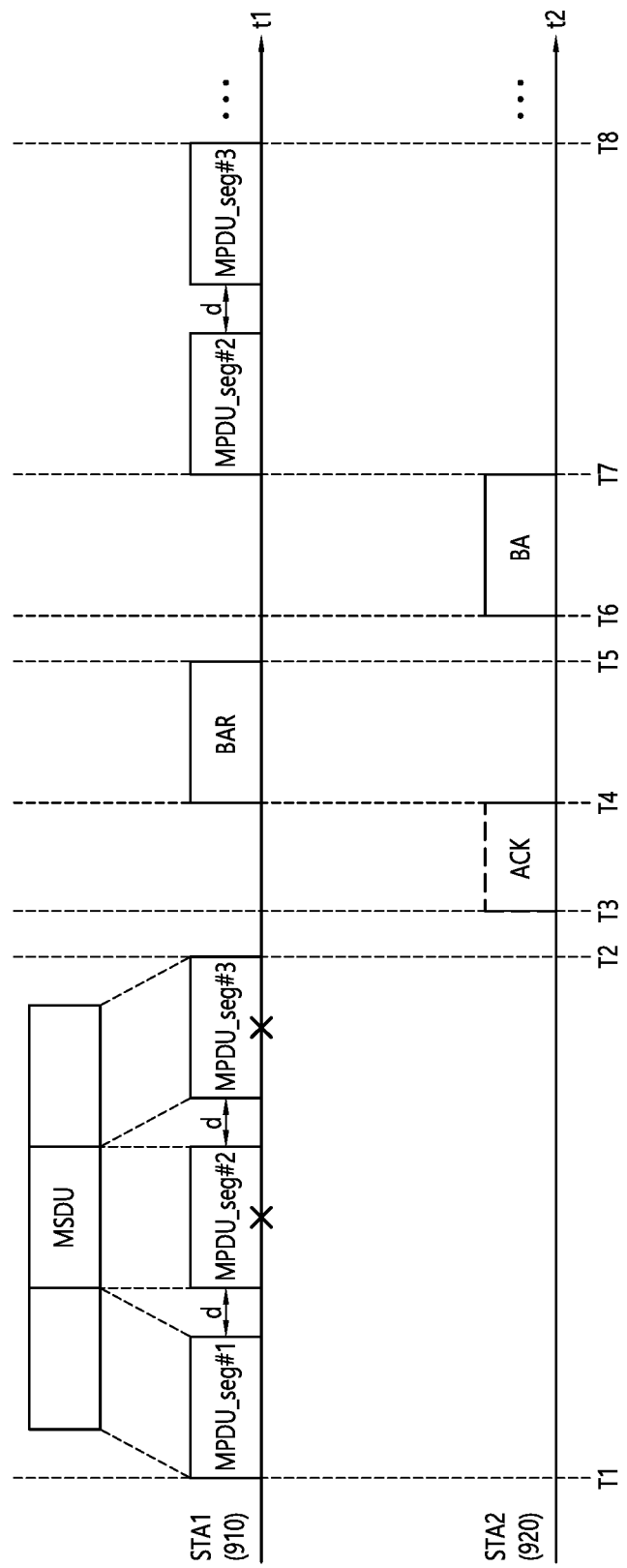
FIG. 9 is a diagram illustrating a method for retransmitting a frame in a wireless LAN system according to the present embodiment.

FIG. 9 is a diagram illustrating a method for retransmitting a frame in a wireless LAN system according to an exemplary embodiment.

Referring to FIGS. 1 to 9, a first wireless terminal 910 and a second wireless terminal 920 may be understood as a terminal including multiple directional antenna modules.

The horizontal axis of the first wireless terminal 910 may correspond to the time t1, and the vertical axis of the first wireless terminal 910 may represent a frame transmitted by the first wireless terminal 910. The horizontal axis of the second wireless terminal 920 may correspond to time t2, and the vertical axis of the second wireless terminal 920 may represent a frame transmitted by the second wireless terminal 920.

In the first time point T1 of FIG. 9, the first wireless terminal 910 may be understood as a terminal that acquires a transmission opportunity (TXOP) through channel competition with another terminal (not shown).

In the first period T1 to T2 of FIG. 9, the first wireless terminal 910 may receive a MAC Service Data Unit (MSDU) from an upper layer (e.g., a logical link control layer) of the first wireless terminal 910. In this case, the size of the MSDU, which is data received from the upper layer, may be greater than a preset threshold value for the first wireless terminal 910.

For example, the preset threshold for the first wireless terminal 910 may be understood as the maximum size of a MAC Protocol Data Unit (MPDU) that can be transmitted by the first wireless terminal 910.

Accordingly, the first wireless terminal 910 according to the present embodiment may segment the MSDU from a higher layer into multiple MAC Protocol Data Units (MPDUs) according to a preset threshold.

For clarity and concise description of FIG. 9, it may be assumed that the first wireless terminal 910 according to the present embodiment divides the MSDU into three MPDUs.

That is, the first wireless terminal 910 according to the present embodiment may transmit a first MPDU (e.g., MPDU_seg #1), a second MPDU (e.g., MPDU_seg #2), and a third MPDU (e.g., MPDU_seg #3) divided from an MSDU to the second wireless terminal 920.

For example, the size of the remaining MPDUs (e.g., MPDU_seg #1 and MPDU_seg #2) other than the last MPDU (e.g., MPDU_seg #3) among the multiple divided MPDUs may be the same. That is, the size of the remaining MPDUs (e.g., MPDU_seg #1, MPDU_seg #2) may correspond to a preset threshold.

In this case, each of the multiple divided MPDUs (i.e., MPDU_seg #1 to MPDU_seg #3) may include division information indicating the total number of the multiple divided MPDUs (e.g., '3') and transmission sequence information indicating a transmission order of each of the multiple divided MPDUs.

For example, the transmission sequence information included in the first MPDU (e.g., MPDU_seg #1) may correspond to '1'. For example, the transmission sequence information included in the second MPDU (e.g., MPDU_seg #2) may correspond to '2'. For example, the transmission sequence information included in the third MPDU (e.g., MPDU_seg #3) may correspond to '3'.

In addition, each of the multiple divided MPDUs (i.e., MPDU_seg #1 to MPDU_seg #3) may further include a unique index value for identifying the MSDU.

According to the present embodiment, each of the multiple divided MPDUs (i.e., MPDU_seg #1 to MPDU_seg #3) may be sequentially transmitted on the basis of a preset interval (d). For example, the preset interval (d) may be SIFS.

For purposes of clarity and conciseness of FIG. 9, it may be assumed that the second MPDU (e.g., MPDU_seg #2) and the third MPDU (e.g., MPDU_seg #3) transmitted by the first wireless terminal 910 is not successfully received by the wireless terminal 920 due to the state of the radio channel.

The second periods T2 to T3 of FIG. 9 may be preset times between the first wireless terminal 910 and the second wireless terminal 920. For example, the preset time may be SIFS, PIFS, DIFS or AIFS.

In the third section T3 to T4 of FIG. 9, since some MPDUs (e.g., MPDU_seg #2 and MPDU_seg #3) among the multiple divided MPDUs are not received by the second wireless terminal according to the foregoing assumption, an acknowledgement (ACK) frame for notifying of successful reception of the multiple divided MPDUs (i.e., MPDU_seg #1 to MPDU_seg #3) is not received by the first terminal 910 until a preset time (e.g., T2 to T3 of FIG. 9) elapses.

In the fourth section T4 to T5 of FIG. 9, the first wireless terminal 910 according to the present embodiment may transmit to the second wireless terminal a Block ACK Request (BAR) frame for determining at least one MPDU to be retransmitted by the first wireless terminal among multiple divided MPDUs.

The fifth section T5 to T6 of FIG. 9 may be a preset time between the first wireless terminal 910 and the second wireless terminal 920. For example, the preset time may be SIFS, PIFS, DIFS or AIFS.

In the sixth periods T6 to T7 of FIG. 9, the first wireless terminal 910 according to the present embodiment may receive a block ACK (BA) frame from the second wireless terminal 920 in response to the BAR frame. In this case, the BA frame may include frame information (e.g., 1) indicating the last MPDU (e.g., MPDU_seg #1) successfully received by the second wireless terminal 920 among the multiple divided MPDUs (e.g., MPDU_seg #1 to MPDU_seg #3).

In the seventh periods T7 to T8 of FIG. 9, the first wireless terminal 910 according to the present embodiment may perform a retransmission procedure on the basis of the received frame information.

For example, as shown in FIG. 9, when the frame information indicates '1', the first wireless terminal 910 may retransmit a second MPDU (e.g., MPDU_seg #2) and a third MPDU (e.g., MPDU_seg #3) to the second wireless terminal 920.

As another example, unlike the case illustrated in FIG. 9, when the frame information indicates '2', the first wireless terminal 910 may retransmit a third MPDU (e.g., MPDU_seg #3) to the second wireless terminal 920.

In an operating environment where the size of traffic data (i.e., MSDU) is required to increase as the 802.11ay standard operates on the basis of the 60 GHz band, the additional burden associated with the buffer of the wireless terminal can be reduced through segmentation operations on the traffic data.

Furthermore, according to the present embodiment, since a procedure for clearly determining the data requiring retransmission operation among the data divided through the segmentation operation is defined, it will be understood that the performance of the overall wireless LAN system can be improved.

The above FIG. 9 is only an example, and it will be understood that the present disclosure is not limited thereto. In other words, it will be appreciated that the ACK frame transmitted by the second wireless terminal 910 may not be successfully received by the first wireless terminal 910 due to the state of a radio channel.

Figure 10:
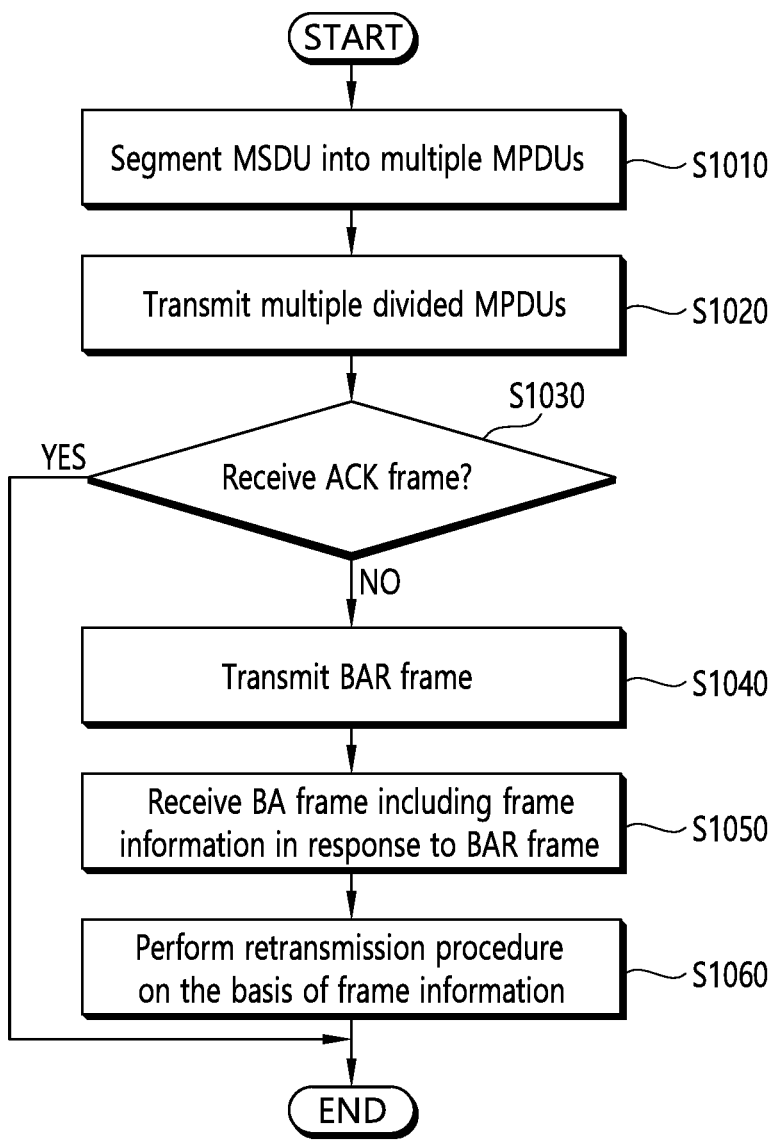
FIG. 10 is a flowchart illustrating a method of retransmitting a frame in a wireless LAN system according to the present embodiment.

FIG. 10 is a flowchart illustrating a method of retransmitting a frame in a wireless LAN system according to the present embodiment.

Referring to FIGS. 9 and 10, in step S1010, a first wireless terminal including multiple directional antenna modules may segment a MAC Service Data Units (MSDU) received from an upper layer of the first wireless terminal into multiple MAC Protocol Data Units (MPDUs).

For example, the upper layer is a Logical Link Control (LLC) layer, and the MSDU may correspond to data received from the LLC layer. For example, the size of the MSDU may be greater than the preset threshold. In addition, the size of the remaining MPDUs other than the last MPDU among the multiple divided MPDUs may be the same.

Specifically, when the MSDU is divided into three through the step S1010, the multiple divided MDPUs may correspond to the first MPDU, the second MPDU, and the third MPDU. In this case, the division information included in each of the first MPDU, the second MPDU, and the third MPDU may correspond to '3'.

In addition, the transmission sequence information included in the first MPDU may correspond to '1'. The transmission sequence information included in the second MPDU may correspond to '2'. The transmission sequence information included in the third MPDU may correspond to '3'.

In step S1020, the first wireless terminal according to the present embodiment may transmit multiple divided MPDUs to the second wireless terminal.

For example, each of the multiple divided MPDUs may include division information indicating the total number of the multiple divided MPDUs and transmission sequence information indicating the transmission order of each of the multiple divided MPDUs.

For example, each of the multiple divided MPDUs may further include a unique index value for identifying the MSDU. In addition, each of the multiple divided MPDUs may be sequentially transmitted without additional channel contention on the basis of a preset interval.

In step S1030, the first wireless terminal according to the present embodiment may determine whether an ACK frame for notifying successful reception of multiple divided MPDUs is received from the second wireless terminal until a preset time elapse.

Specifically, the ACK frame according to the present disclosure may be a frame for notifying that the second wireless terminal has successfully received all of the multiple divided MPDUs.

If the ACK frame is received from the second wireless terminal before the preset time elapses, the procedure ends. If the ACK frame is not received from the second wireless terminal until a preset time (e.g., SIFS) elapses, the procedure may proceed to step S1040.

In step S1040, the first wireless terminal may transmit a Block ACK Request (BAR) frame for determining at least one MPDU to be retransmitted by the first wireless terminal among the multiple divided MPDUs to the second wireless terminal.

In step S1050, the first wireless terminal may receive a Block ACK (BA) frame from the second wireless terminal in response to the BAR frame. For example, the BA frame may include frame information indicating the last MPDU successfully received by the second wireless terminal among the multiple divided MPDUs.

That is, in response to the BAR frame, the second wireless terminal may derive the frame information with reference to the division information and the transmission sequence information.

For example, when only the first MPDU having the division information '3' and the transmission sequence information '1' is received by the first wireless terminal, the frame information included in the BA frame may be derived as '1'.

As another example, when only the first MPDU having division information '3' and transmission sequence information '1' and the second MPDU having division information '3' and transmission sequence information '2' are received by the first wireless terminal, the frame information included in the BA frame may be derived as '2'.

In step S1060, the first wireless terminal may perform a retransmission procedure on the basis of the frame information.

For example, if the frame information indicates '1', the first wireless terminal may confirm that the second MPDU and the third MPDU transmitted by the first wireless terminal are not successfully received by the second wireless terminal according to the frame information. Accordingly, the first wireless terminal may retransmit the second MPDU and the third MPDU to the second wireless terminal.

As another example, if the frame information indicates '2', the first wireless terminal may confirm that the third MPDU transmitted by the first wireless terminal is not successfully received by the second wireless terminal according to the frame information. Accordingly, the first wireless terminal may retransmit the third MPDU to the second wireless terminal.

With regard to the retransmission procedure, additional embodiments may be considered. For example, in the retransmission procedure, the wireless terminal may retransmit only the last transmitted MPDU among the multiple divided MPDUs. In this case, the more segment index of the last transmitted MPDU may be '0'.

Alternatively, the wireless terminal may retransmit all MPDUs having the same unique index value of the MSDU. Alternatively, the MSDU may attempt to transmit the next MSDU by skipping the MSDU failed to transmit.

Figure 11:
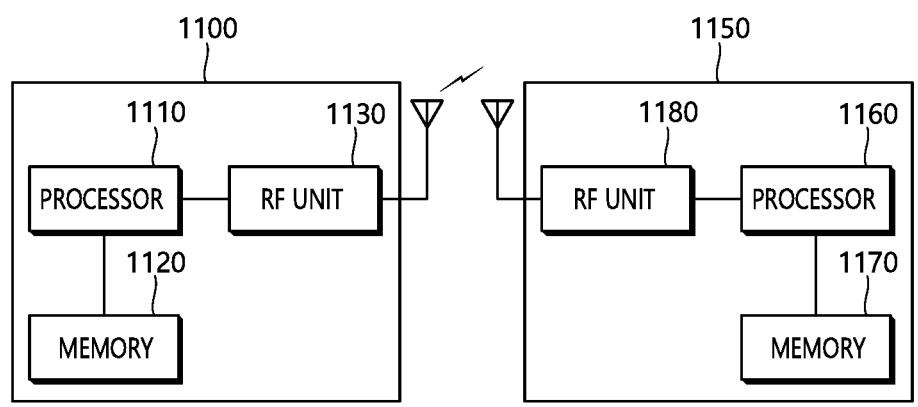
FIG. 11 is a block diagram illustrating a wireless terminal to which an embodiment of the present disclosure can be applied.

FIG. 11 is a block diagram illustrating a wireless terminal to which an embodiment of the present disclosure can be applied.

Referring to FIG. 11, a wireless terminal may be an AP or a non-AP STA, as an STA which may implement the above-described embodiment. The wireless terminal may correspond to the above-described user or may correspond to a transmitting terminal for transmitting a signal to the user.

The AP 1100 includes a processor 1110, a memory 1120, and a radio frequency (RF) unit 1130. The RF unit 1130 may be coupled to the processor 1110 to transmit/receive a radio signal. The processor 1110 may implement the functions, processes, and/or methods proposed herein. For example, the processor 1110 may perform an operation according to the above-described exemplary embodiment of FIGS. 1 to 10.

The non-AP STA 1150 includes a processor 1160, a memory 1170, and an RF unit 1180.

The RF unit 1180 may be coupled to the processor 1160 to transmit/receive a radio signal. The processor 1160 may implement the functions, processes, and/or methods proposed in the present embodiment. For example, the processor 1160 may be implemented to perform the non-AP STA operation according to the present embodiment described above.

The processor 1110 and 1160 may include an application-specific integrated circuit (ASIC), another chip set, a logic circuit, a data processing device, and/or a converter for mutually converting baseband signals and radio signals. The memory 1120 and 1170 may include Read-Only Memory (ROM), Random Access Memory (RAM), flash memory, memory cards, storage media and/or other storage devices. The RF unit 1130 and 1180 may include one or more antennas for transmitting and/or receiving a radio signal.

When the embodiment of the present disclosure is implemented in software, the above-described technique may be implemented as a module (process, function, etc.) for performing the above-described function. The module may be stored in the memory 1120 and 1170 and executed by the processor 1110 and 1160. The memory 1120 and 1170 may be disposed to the processor internally or externally and connected to the processor using a variety of well-known means.

The non-AP STA 1150 includes a processor 1160, a memory 1170, and an RF unit 1180.

The RF unit 1180 may be coupled to the processor 1160 to transmit/receive a radio signal.

The processor 1160 may implement the functions, processes, and/or methods proposed in the present embodiment. For example, the processor 1160 may be implemented to perform the non-AP STA operation according to the present embodiment described above. The processor 1160 may perform an operation of the non-AP STA disclosed in the present embodiment of FIGS. 1 to 10.

The processors 1110 and 1160 may include an application-specific integrated circuit (ASIC), another chip set, a logic circuit, a data processing device, and/or a converter for mutually converting baseband signals and wireless signals. The memory 1120 and 1170 may include Read-Only Memory (ROM), Random Access Memory (RAM), flash memory, memory cards, storage media and/or other storage devices. The RF unit 1130 and 1180 may include one or more antennas for transmitting and/or receiving a radio signal.

When the present embodiment is implemented in software, the above-described technique may be implemented as a module (process, function, etc.) for performing the above-described function. The module may be stored in the memory 1120 and 1170 and executed by the processors 1110 and 1160. The memory 1120 and 1170 may be disposed to the processor internally or externally and connected to the processor using a variety of well-known means.

In the detailed description of the present disclosure, specific embodiments have been described, but various modifications are possible without departing from the scope of the present disclosure. Therefore, the scope of the present disclosure should not be limited to the above-described embodiments, but should be determined not only by the claims below but also by the equivalents of the claims of the present invention.

What is claimed is:

1. A method for a first station (STA) including multiple directional antenna modules in a wireless local area network (LAN) system, the method comprising:
   segmenting a MAC Service Data Unit (MSDU) received from an upper layer of the first STA into multiple MAC Protocol Data Units (MPDUs),
   wherein the segmented MPDUs include a first MPDU, a second MPDU, and a third MPDU;
   transmitting the segmented MPDUs to a second STA,
   wherein each of the segmented MPDUs includes a first information field related to a total number of the segmented MPDUs and a second information field related to a transmission order of the segmented MPDUs;
   after an acknowledgement (ACK) frame of successful reception of the segmented MPDUs is not received from the second STA, transmitting a Block ACK Request (BAR) frame to the second STA;
   receiving a Block ACK (BA) frame from the second STA in response to the BAR frame, wherein the BA frame includes frame information related to a last MPDU successfully received by the second STA among the segmented MPDUs; and
   retransmitting at least one of the segmented MPDUs to the second STA based on the frame information,
   wherein the second MPDU and the third MPDU are retransmitted for the frame information having a value one (1), and
   wherein the third MPDU is retransmitted for the frame information having a value two (2).

2. The method of claim 1, wherein each of the segmented MPDUs further includes a unique index value for identifying the MSDU.

3. The method of claim 1, wherein the upper layer is a logical link control (LLC) layer.

4. The method of claim 1, wherein the ACK frame is not received within a Short Inter Frame Space (SIFS) from a transmission time of the segmented MPDUs.

5. A first station (STA) in a wireless local area network (LAN) system, the first STA comprising:
   a transceiver configured to transmit and receive radio signal via multiple directional antenna modules; and
   a processor coupled to the transceiver; the processor configured to:
   segment a MAC Service Data Unit (MSDU) received from an upper layer of the first STA into multiple MAC Protocol Data Units (MPDUs),
   wherein the segmented MPDUs include a first MPDU, a second MPDU, and a third MPDU,
   transmit the segmented MPDUs to a second STA,
   wherein each of the segmented MPDUs includes a first information field related to a total number of the segmented MPDUs and a second information field related to a transmission order of the segmented MPDUs;
   after an acknowledgement (ACK) frame for successful reception of the segmented MPDUs is not received from the second STA, transmit a Block ACK Request (BAR) frame to the second STA;
   receive a Block ACK (BA) frame from the second STA in response to the BAR frame,
   wherein the BA frame includes frame information related to a last MPDU successfully received by the second STA among the segmented MPDUs; and
   retransmit at least one of the segmented MPDUs to the second STA based on the frame information,
   wherein the second MPDU and the third MPDU are retransmitted for the frame information having a value one (1), and
   wherein the third MPDU is retransmitted for the frame information having a value two (2).

6. The first STA of claim 5, wherein each of the segmented MPDUs further includes a unique index value for identifying the MSDU.

7. The first STA of claim 5, wherein the upper layer is a logical link control (LLC) layer.

8. The first STA of claim 5, wherein the ACK frame is not received within a Short Inter Frame Space (SIFS) from a transmission time of the segmented MPDUs.

* * * * *